Aug. 5, 1958     J. F. STEPHENS ET AL     2,846,157
APPARATUS FOR WINDING SUPERFINE GLASS FIBER
Filed May 11, 1953                         5 Sheets-Sheet 1

INVENTORS.
Joseph F. Stephens
George H. Sowers
BY Thos. E. Scofield
ATTORNEY.

Aug. 5, 1958   J. F. STEPHENS ET AL   2,846,157
APPARATUS FOR WINDING SUPERFINE GLASS FIBER
Filed May 11, 1953   5 Sheets-Sheet 3

INVENTORS.
Joseph F. Stephens
George H. Sowers
BY
Thos. E. Scofield
ATTORNEY.

Aug. 5, 1958  J. F. STEPHENS ET AL  2,846,157
APPARATUS FOR WINDING SUPERFINE GLASS FIBER
Filed May 11, 1953  5 Sheets-Sheet 4

INVENTORS.
Joseph F. Stephens
George H. Sowers
BY
Thos. E. Scofield
ATTORNEY.

Aug. 5, 1958  J. F. STEPHENS ET AL  2,846,157
APPARATUS FOR WINDING SUPERFINE GLASS FIBER
Filed May 11, 1953  5 Sheets-Sheet 5

INVENTORS.
Joseph F. Stephens
George H. Sowers
BY
Thos. E. Scofield
ATTORNEY.

United States Patent Office 2,846,157
Patented Aug. 5, 1958

2,846,157

APPARATUS FOR WINDING SUPERFINE GLASS FIBER

Joseph F. Stephens, Kansas City, Mo., and George H. Sowers, Spring Hill, Kans., assignors to Gustin-Bacon Manufacturing Company, a corporation of Missouri Application May 11, 1953, Serial No. 353,964

12 Claims. (Cl. 242—18)

The present invention relates in general o the manufacture of glass fiber, and it deals more particularly with controlling the size or diameter of the fiber.

The object of the invention, broadly speaking, is to provide an improved method and apparatus for obtaining glass fiber of predetermined uniform diameter in commercial quantities or job lots that are completely free of fiber departing from the desired size; more particularly, it is our objective to obtain superfine fiber of 8.9 to 9.5 micron size in quantities that are uncontaminated by coarser fiber intermingled therewith.

To this end, it is a further object of the invention to provide a method and apparatus for producing glass fiber on a continuous basis and, as it is produced, collecting the fiber in different lots according to size, the collecting operation being shifted selectively from one lot to another without interruption in production of the fiber in accordance with the instantaneous size of the fiber.

In carrying out our invention, we employ a rotating drum to which the fiber is attached and which serves both to draw the fiber from a conventional fiber-generating bushing or furnace and also to wind up the fiber thus produced. In conjunction with this, a feature of the invention resides in the provision of means for causing the fiber to be fed onto the drum in different axially restricted and axially separated regions thereof, depending upon the fiber size at any given instance.

According to our invention, so long as superfine fiber of the desired character is being drawn, we cause the fiber to be fed onto the drum in level layers extending over the major portion of its length by employing a level winding mechanism which slowly shifts the feeding of the fiber axially of the drum, first in one direction and then the other, so the layers are superimposed over one another with successive layers proceeding in opposite directions along the drum. Whenever the fiber generated is coarser than desired, we cause the feeding of the fiber onto the drum to be shifted axially to a point beyond the region of said lever winding so that the coarser fiber is wound on the drum in a limited zone removed from the superfine fiber. The respective sizes of fiber thus are kept separate from one another without any interruption in the continuity of the drawing of the fiber, and when the winding thereof on the drum has been completed, the two sizes can be removed from the drum as separate hanks, neither of which is contaminated by fiber of the other size.

A feature of the invention resides not only in winding the coarser fiber on the drum in a region spaced axially from the level winding of the superfine fiber, but also in effecting the shift in the feeding of the fiber from one of said windings to the other at relatively high speed as compared with the rate of shift involved in producing the level winding of the superfine fiber; this is important in that it achieves a clear and decisive zone of separation between the superfine and coarser windings.

Other and further objects of the invention together with additional features of novelty whereby the objects are achieved will appear in the course of the following description of the invention.

In the accompanying drawings which form a part of the specification and are to be read in conjunction therewith, and in which like reference numerals are employed to indicate like parts of the various views.

Figures 1, 2, 3, 9:
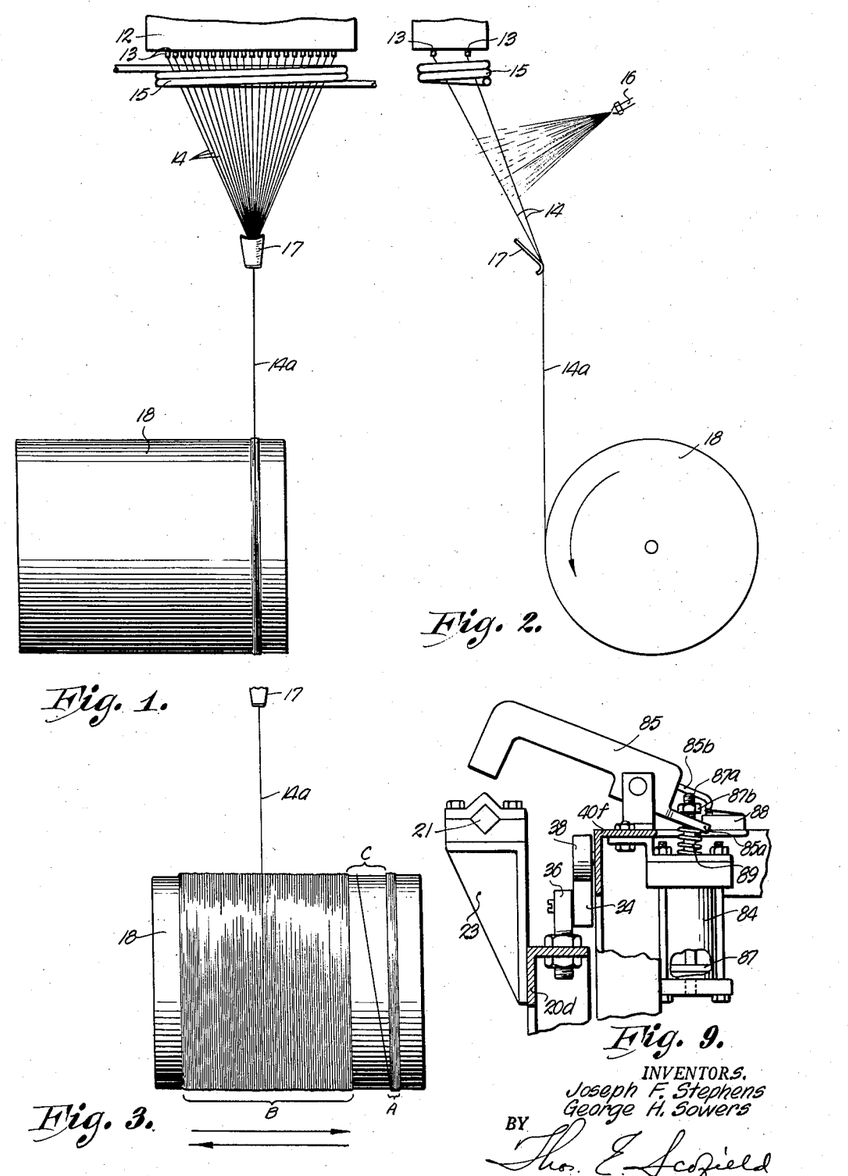
Fig. 1 is a schematic side elevation of apparatus for making superfine glass fibers according to the method of the present invention.
Fig. 2 is an end view of the apparatus shown in Fig. 1.
Fig. 3 is a side elevational view similar to Fig. 1 but showing the wind-up drum shifted axially relative to the fiber-gathering shoe.
Fig. 9 is an enlarged sectional elevation taken along the line 9—9 of Fig. 5 in the direction of the arrows.

Before describing our apparatus in detail, it will be helpful to outline our method of making superfine glass fibers, reference being had for this purpose to Figs. 1, 2 and 3. These show a conventional bushing or furnace 12 in which the glass is melted. In the bottom of the bushing are multiple orifices 13 through which the molten glass can issue and be drawn into filaments 14. Conventionally the filaments pass through a cooling coil 15 or the like positioned near the point at which they originate, then are gathered into a strand 14a by means of a shoe 17, the strand being drawn continuously downward by a rotating drum 18 which serves to wind up and collect the fibers. A liquid sizing may be applied to the fibers by a spray gun 16 and/or by wiping the sizing material onto the strand 14a, for example at the point where the strand passes through shoe 17.

A number of factors influence the diameter of the filaments 14, principal among these being the chemical composition of the glass melt in furnace 12, the temperature of the melt (hence its viscosity) and the degree of attenuation of the fibers in the formative region immediately below the nipples 13. The degree of attenuation is determined in major part by the speed at which strand 14a is drawn downwardly; thus, by holding the other factors constant, it has been found that a wide variation in the filament diameter is obtained by varying the speed of rotation of drum 18.

Conversely, by maintaining the speed of the drum constant at a predetermined value, filaments of predetermined uniform diameter can be obtained continuously. As suggested hereinbefore, it is desired in practice to obtain filaments whose diameter is of the order of 8.9 to 9.5 microns. We have found that under optimum conditions as to viscosity of the melt, and with the fiber-generating apparatus employed in practical plant operation, this requires strand 14a to be drawn down and wound onto drum 18 at the rate of approximately 10,000 linear feet per minute.

In winding up strands such as 14a, it is a common practice to reciprocate the winding drum slowly in an axial direction so that the strand is wound in level layers, each layer being a helix extending substantially the full length of the drum, and the successive superimposed layers being wound in opposite directions. The same result obviously can be obtained by traversing the bushing assembly (that is to say, the bushing 12, cooling coil 15 and shoe 17) as a unit alternately to the left and to the right relative to the drum 18 which, in this case, only rotates but does not travel axially.

Now, as previously indicated, throughout such time as drum 18 rotates at a speed which will draw the filaments at the desired rate (say, 10,000 linear feet per minute), the filaments will be of the desired fineness. However, after strand 14a has been attached to the drum preparatory to winding, the latter must, of course, be brought up to the desired speed; during this period of acceleration, the filaments necessarily are drawn at a slower rate, so in practice are larger in diameter than desired. Also, if the drum thereafter drops below the optimum running speed (for example, due to fluctuation in the speed of its prime mover) the filaments again will increase to a diameter larger than desired.

Thus it will be seen that if the drum is reciprocated axially throughout the entire period of its rotation (or, alternatively, if the bushing assembly is traversed relative to the drum throughout this period), there will be intermixed with the fibers of desired diameter that are wound on the drum a considerable quantity of fiber which is larger than desired. The latter will inevitably be present in the innermost layer or layers on the drum and in some instances may also be present in the intermediate and outermost layers; which ever may be the case, it is impossible thereafter to segregate the coarser fibers from those of desired fineness without great expense, and from a practical standpoint the entire collection of fiber must be considered imperfect and substandard.

According to our invention, we obviate these difficulties by the following method: Referring to Fig. 1, after attaching the strand 14a to the drum 18, we bring the drum up to the desired speed without either shifting the drum axially or moving the bushing assembly relative to the drum. Accordingly, the fibers drawn during this period of acceleration, which naturally are coarser then desired, are wound onto the drum in the region A. When the drum reaches the speed necessary for producing filaments of the desired fineness, i. e., full speed, we shift it to the right as shown in Fig. 3 (or, alternatively, shift the bushing assembly to the left) so that the strand 14a travels into the region B of the drum; and thereafter so long as the drum continues to travel at full speed, we reciprocate the drum (or bushing assembly) slowly to produce level winding of the strand throughout the length of region B only. If for any reason the speed of drum 18 drops, we immediately shift the bushing assembly, or drum, so that the coarse fiber then generated will be wound on the drum only in the region A; and if the speed-drop represents a transient condition, the bushing or drum subsequently is again shifted so that winding will be resumed in region B as soon as the drum speed is restored to the proper value for producing filaments of the desired fineness. As a result of this mode of operation, it will be clear that all of the fine fibers are wound on the drum in region B, while all of the coarse fibers are in region A.

Assuming that the drum is the element of our system which is reciprocated to produce level winding of strand 14a in the region B, this may of course also be the element that is shifted to transfer winding of the strand from region A to region B and vice versa. On the other hand, if the bushing assembly is reciprocated to produce level winding in the region B, this may also be moved to shift the winding operation from region A to region B and vice versa. As still another alternative, the shift between regions A and B may be accomplished by a lateral movement of the bushing assembly, while level winding of strand 14a in region B subsequently is accomplished by axial reciprocation of the drum; or the shift between regions A and B may be effected by axial translation of the drum, while level winding in region B is carried out by subsequent reciprocation of the bushing assembly.

In any case, we prefer that the movement which accomplishes the shift of the winding operation from region A to region B or vice versa be carried out at higher speed than the rate of movement involved in the reciprocation which produces level winding of strand 14a in region B. The latter rate of translation is relatively slow so that, as shown in Fig. 3, adjacent terms of the strand are close together in region B. However, in order that there may be a clear and definite zone of demarcation between regions A and B, the shift of the winding operation from one of these regions to the other is carried out at higher speed, which leaves relatively bare the section of the drum between regions A and B. That is to say, the intermediate section C is crossed by only one—or perhaps a few—spiral turns, these being of considerably greater pitch than are the turns which appear in regions A and B. This makes it easy, when the winding operation has been completed, to sever the few connecting strands that cross section C of the drum, and, in removing the collected fiber from the drum, to keep the fine fibers wound on section B separate from the coarser fibers wound on section A.

Figures 4, 12:
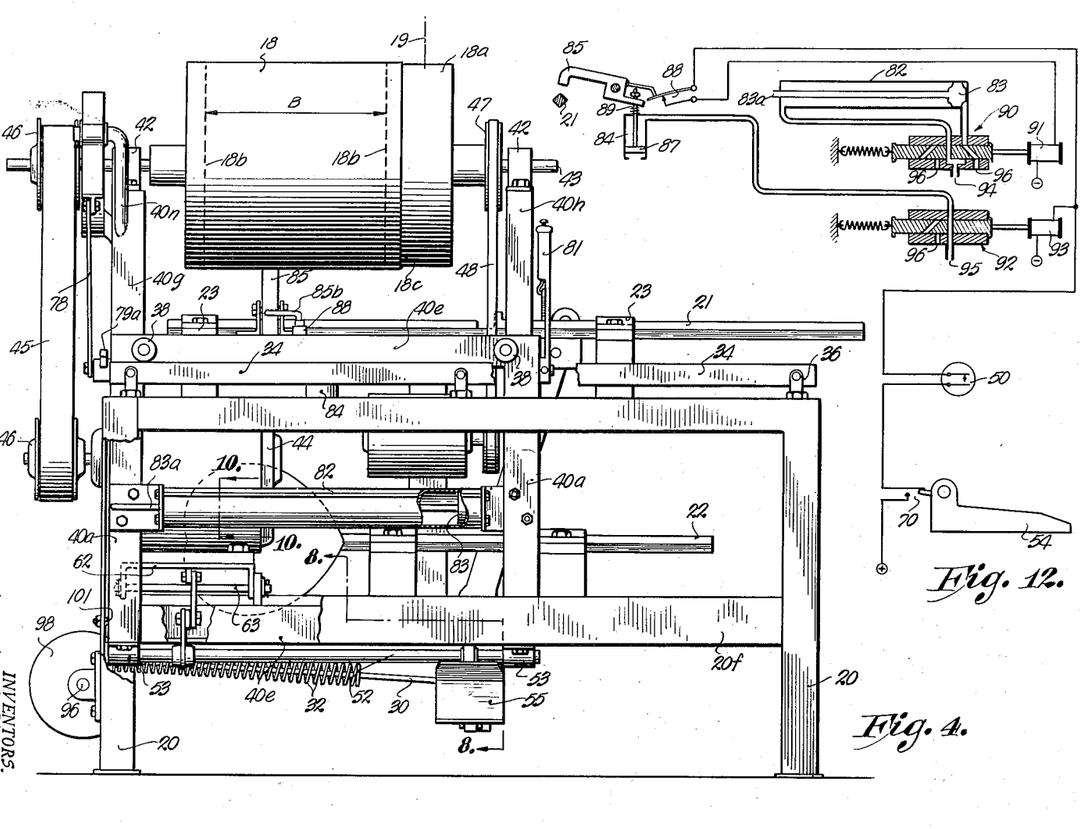
Fig. 4 is an elevational view of the front or operator's side of one practical form of machine for carrying out the fiber-winding operation according to the invention, parts having been broken away for purposes of illustration.
Fig. 12 is a diagrammatic showing of the electrical and pneumatic components of our machine and the system connections by which the machine is controlled.
Figure 5:
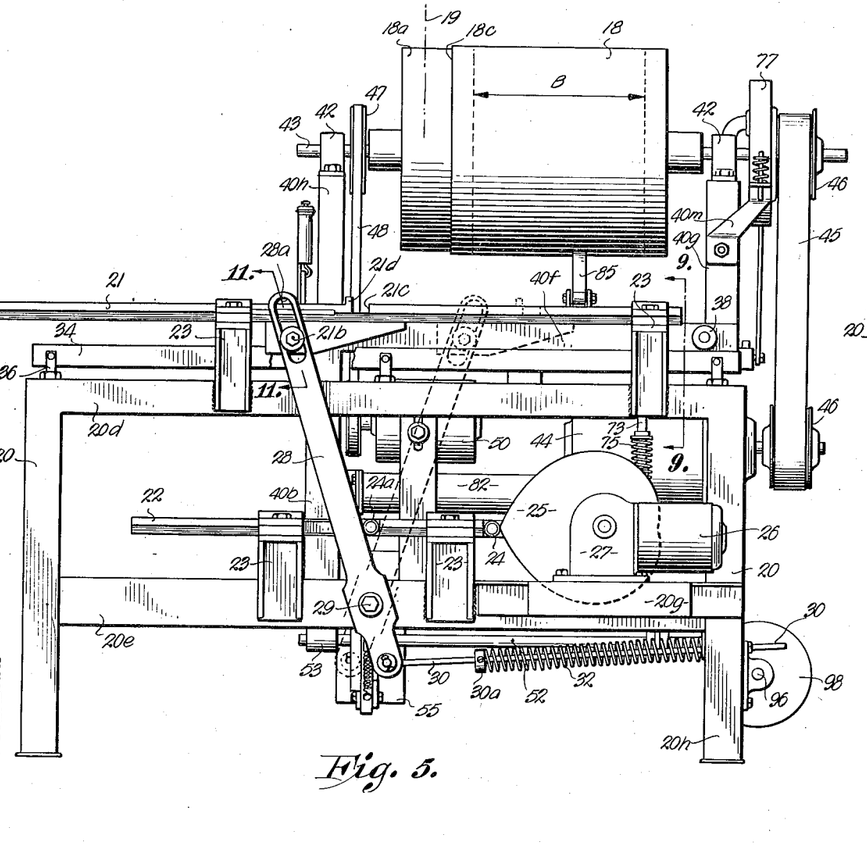
Fig. 5 is a rear elevational view of the same machine.

Now, the above described method of insuring that only fine fiber is wound on section B of the drum while the coarser fiber is wound on section A may be carried out under the manual control of an operator who watches a tachometer registering the speed of rotation of the drum. That is to say, in accordance with the registered drum speed, he may through a suitable lever system manually shift the drum axially and/or shift the bushing assembly laterally at the proper time and at the proper rate to produce the foregoing results. We prefer, however, that all this be done automatically, and will now describe one suitable form of machine for accomplishing this end, reference being had to Figs. 4 to 12. This machine is arranged for use with a fiber generating bushing which is permanently mounted in a stationary position above the machine, its position being such that, in operation, the strand of gathered fibers always proceeds downwardly from the collecting shoe, not shown, along the line 19 (Figs. 4 and 5).

Figure 7:
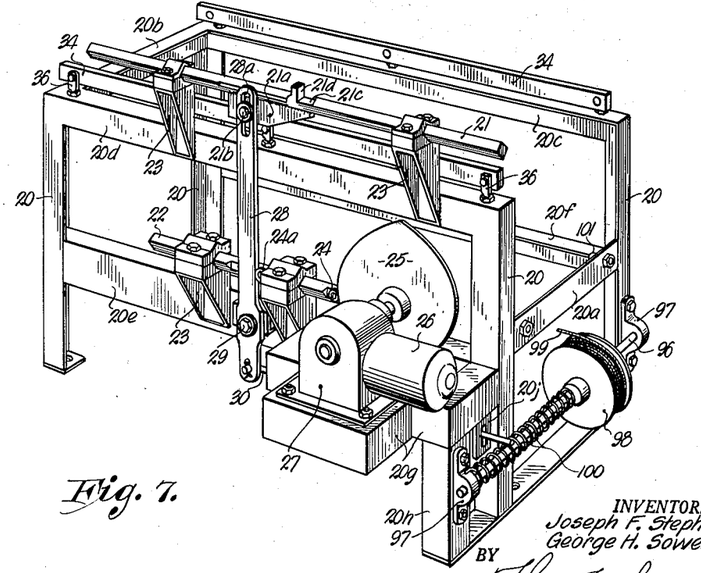
Fig. 7 is a rear perspective view of the stationary frame of our machine showing the mechanism mounted thereon.

The frame of our machine, as best seen in Fig. 7, has four upright legs 20 which preferably are bolted or otherwise secured to the floor. These are connected together and braced by a pair of crosspieces 20a and 20b at the ends of the frame and by four horizontal members 20c, 20d, 20e and 20f extending longitudinally of the frame. Conveniently, all of the aforementioned frame components except 20a are metal angle members welded together at their junctions to form a strong rigid structure; member 20a is an elongated flat plate welded at its ends to the forward and rear legs, as shown. At the rear of the frame, a low platform 20g is secured to the horizontal member 20e and supported by a short auxiliary leg 20h.

A pair of vertically spaced horizontal bars 21 and 22 are shiftably supported on the frame by means of brackets or guides 23 which are welded or otherwise secured to the rear frame members 20d and 20e, it being understood that each bar thus is adapted for reciprocation in an endwise direction. The lower bar 22 carries a pair of rollers 24 and 24a, the first of which comprises a cam follower bearing against the margin of a heart-shaped cam 25; the cam is driven by a motor 26 through conventional speed reduction gearing contained in the housing 27, this assembly being mounted on the platform 20g.

The second roller 24a bears against a rocker arm 28 pivoted to the frame at 29. Hingedly connected to the lower end of the arm is a rod 30 which extends under the platform 20g and has its free end loosely received in an apertured plate 20j depending from the platform. A coiled compression spring 32 (Fig. 5) encircling the rod between this plate and a collar 30a secured to the rod, always urges the rocker arm 28 clockwise, as seen in Figs. 5 and 7, so the arm, through its engagement with the roller 24a, exerts a horizontal thrust on bar 22 serving to normally maintain the roller 24 in engagement with the margin of cam 25. (The collar 30a is secured to the rod 30 by a set screw, permitting adjustment of the collar axially of the rod to adjust the tension of the spring.)

It will be apparent that as the cam turns, it moves bar 22 and arm 28 to the left against the tension of spring 32 during one-half revolution of the cam, and during the succeeding half revolution the arm and bar and moved in the opposite direction by spring 32, whereby the upper end of the arm travels back and forth at uniform speed. The upper end of the rocker arm is connected to the horizontal bar 21 through the medium of a plate 21a welded to the underside of the bar and a stub bearing assembly 21b extending from the plate into an elongated slot 28a in the arm; accordingly bar 21 is reciprocated axially in unison with the movement of bar 22.

A pair of laterally spaced horizontal rails 34 are mounted on the frame by means of posts 36, the latter having threaded stems secured to the frame members 20c and 20d by nuts as shown in Fig. 9. This threaded-post mounting permits limited vertical adjustment of the rails for the purpose of insuring that the two rails are at the same level and also makes it possible to replace the rails easily when they become worn. On the rails, the carriage of our machine is supported by rollers 38 for movement longitudinally of the frame, and this carriage now will be described.

Figure 7A:
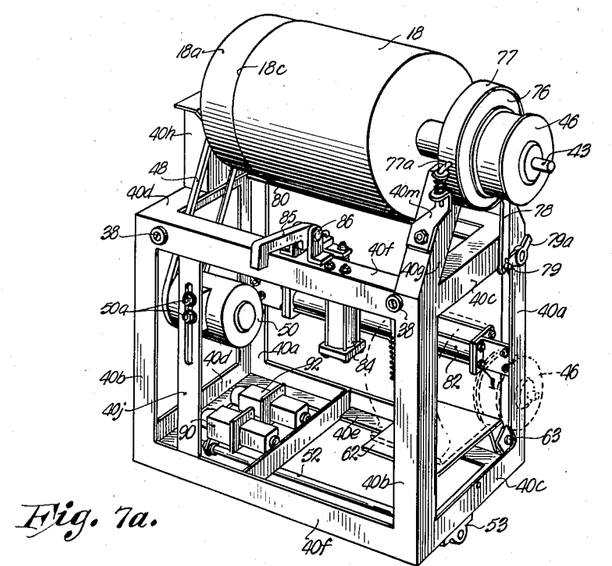
Fig. 7a is a rear perspective view of the carriage of our machine showing the mechanism mounted thereon.

As may best be appreciated from Fig. 7a, the carriage chassis comprises uprights 40a and 40b, cross members 40c and 40d and longitudinal members 40e and 40f, all rigidly connected together to form a generally rectangular open framework; this has a superstructure including upwardly converging struts 40g at one end of the carriage and a post 40h at the other end. As indicated in the drawings, members 40a to 40g very conveniently are angle members and 40h a channel, all these being welded together at their junctions so the carriage comprises a rigid unitary structure.

Mounted in a pair of bearings 42 on the superstructure is a shaft 43 carrying the drum 18 which is keyed to the shaft to turn therewith. The shaft and drum are arranged to be driven by a motor 44 through the medium of a belt 45 and pulleys 46. Shaft 43 also is connected by pulleys 47 and a belt 48 to a conventional centrifugal switch 50, the latter being mounted on the vertical carriage member 40j by means of bolts 50a which extend through an elongated slot in the supporting member; this arrangement permits limited vertical adjustment of the switch for the purpose of properly tightening belt 48.

Figure 8:
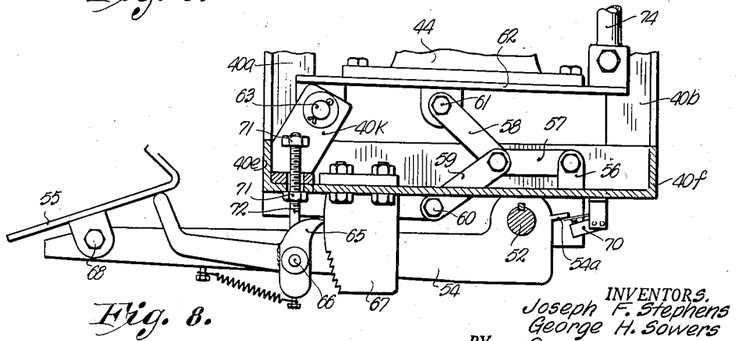
Fig. 8 is an enlarged cross section taken along the line 8—8 of Fig. 4 in the direction of the arrows.

Underneath the carriage, a shaft 52 is supported in bearings 53 and this has keyed to it a lever arm 54 (Figs. 6 and 8) which carries a foot treadle 55 at its free end. Mounted on shaft 52 to turn therewith under control of lever 54 is a bell crank 56. This, as may best be seen in Fig. 8, is connected by a link 57 to the center of a partially folded toggle made up of links 58 and 59. The lower end of the toggle is hinged to the carriage at 60, while the upper end is hinged at 61 to the underside of a platform 62. Platform 62 carries the motor 44 and is hingedly supported at one edge so that the opposite edge can swing up and down, under control of the toggle; the platform hinge comprises a horizontal axle 63 which is carried by apertured lugs 40k welded to the carriage chassis.

Thus, referring to Fig. 8, when pressure is applied to treadle 55 to move the free end of lever 54 downwardly, this turns shaft 52 and bell crank 56 counterclockwise; the latter therefore applies to the center of the toggle a thrust directed to the left causing the toggle to straighten somewhat and move platform 62 upwardly about its hinge 63. A spring-biased detent 65 is pivoted at 66 on the lever arm 54, and when the arm is moved downwardly as described, this cooperates with a stationary ratchet 67 on the underside of the carriage to hold the arm down and hence hold platform 62 in raised position. Treadle 55, however, is adapted to be tilted forwardly about pivot 68 to release the detent, whereupon the free end of arm 54 can rise, permitting the platform 62 to descend to the position shown in Fig. 8. A projection 54a on the rear of the lever arm is arranged to close a switch 70 upon upward movement of the treadle-end of the arm and to open the switch upon downward movement of the treadle-end. The purpose of this switch will be explained presently.

The stroke of lever arm 54 (and consequently the travel of platform 62) is limited by a pair of stop nuts 71 on a threaded stem 72; this stem extends through an aperture in the carriage member 40e, and is attached at its lower end to lever 54. By turning the nuts, they obviously can be adjusted along the stem for the purpose of adjusting the upper and lower limit positions of the platform. When the platform is in its lowermost position, belt 45 is drawn taut between pulleys 46 so that the motor 44 will drive the drum 18; on the other hand, when the platform is raised, the belt becomes too loose to be effective in driving the drum.

The weight of the motor always urges the platform downwardly, of course, and supplementing this, we provide a pair of telescoping members 73, 74 (Fig. 6) the lower one of which is hingedly connected to the rear of the platform while the upper one is hingedly connected to the upper longitudinal carriage member 40f. Between collars on the respective members is a coiled compression spring 75 always urging the members apart and thus always exerting a downward thrust on the rear edge of the platform which obviously assists in maintaining the belt 45 taut when the motor is driving drum 18. One or both of the collars on the telescoping members is provided with set screws to permit axial adjustment of the collar for the purpose of adjusting the downward thrust on the rear of the platform exerted by the spring.

On the shaft 43 is a brake drum 76 loosely embraced by a brake band 77, the latter being held in proper position by a spring-mounted centering pin 77a which is loosely received in an apertured bracket 40m on one of the carriage struts. One end of the brake band is anchored to a rigid arm 40n extending upwardly from the opposite strut; the other end of the band is connected by a tie rod 78 to a crank arm 79 keyed to one end of a shaft 80. The shaft extends longitudinally of the carriage just below the upper carriage member 40e and has a brake control lever 81 secured to its opposite end.

Figure 6:
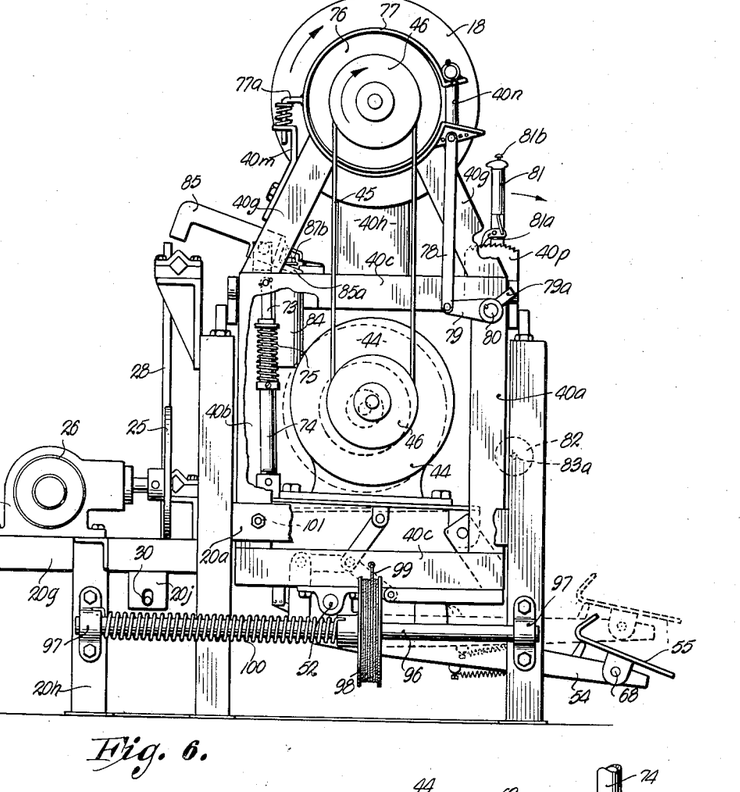
Fig. 6 is an end view of the machine, with parts broken away for purposes of illustration.

Referring to Fig. 6, when the operator draws the brake lever 81 toward himself as indicated by the arrow, this turns shaft 80 and crank 79 clockwise, causing rod 78 to move upwardly and tighten the brake band 77 on the brake drum, for braking of shaft 43 and drum 18. The operating lever is adapted to be locked in effective braking position by a conventional ratchet 40p and detent 81a, the detent being releasable however by pressing on the thumb button, 81b, whereupon lever 81, shaft 80 and crank 79 can move counterclockwise to free shaft 43 and drum 18 for rotation.

Figure 10:
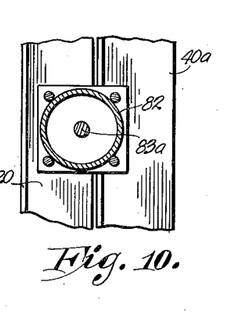
Fig. 10 is an enlarged cross section taken along the line 10—10 of Fig. 4 in the direction of the arrows.
Figure 11:
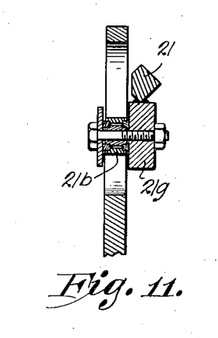
Fig. 11 is an enlarged cross section taken along the line 11—11 of Fig. 5 in the direction of the arrows.

Also mounted on the carriage chassis are two pneumatic cylinders 82 and 84, each containing a piston adapted to be actuated by compressed air or other suitable gaseous media under pressure. The first of these cylinders is horizontally disposed along the front of the carriage and projects slightly forward thereof so that the end of its piston rod 83a confronts the face of one of the legs 20 of the stationary frame as shown in Figs. 4, 6 and 10. Therefore, as will be appreciated from Fig. 4, when the piston 83 is driven by air pressure toward the left end of cylinder 82, its piston rod abuts the stationary leg 20 and the consequent rearward thrust on the cylinder causes same to move to the right. Upon such movement the whole carriage necessarily travels on rollers 38 along rails 34 toward the right-hand end of the supporting frame.

The second pneumatic cylinder 84 is mounted in an upright position on the rear of the carriage adjacent a pawl or latching dog 85 which is pivoted to the carriage at 86. The main body of the dog extends rearwardly from the carriage and overhangs bar 21 which has a notch 21c adapted to receive the dog. Referring to Fig. 9, a forwardly projecting tongue 85a on the dog is apertured to loosely receive the piston rod 87a and the latter has a nut 87b threaded to its upper end whereby downward movement of the piston 87 lifts the dog out of the notch as shown. Adjacent the dog is a switch 88 which is adapted to be closed by a finger 85b on the dog when same is lifted out of the notch. A coiled compression spring 89 encircling the piston rod between the tongue 85a and the top of the cylinder 84 serves to move the dog downwardly toward bar 21 upon upward movement of the piston 87.

The air supply lines for the two pneumatic cylinders have been omitted from Figs. 4–6 and 8–10 for the sake of simplicity, as have also the valves which control the air supply. These are shown schematically, however, in Fig. 12, from which it will be seen that spring-biased valves 90 and 92 are arranged to be actuated by solenoids 91 and 93, respectively, both solenoids normally being de-energized. Air under pressure is connected to the respective valves via supply lines 94 and 95; the valve ports 96 are open to the atmosphere. Thus, air from line 94 normally passes through valve 90 into the left-hand end of cylinder 82 maintaining the piston 83 at the right-hand end of the cylinder as shown in Fig. 12 and also in Fig. 4. At the same time, air from line 95 passes through valve 92 into the upper end of cylinder 84 holding piston 87 down, whereby the latching dog 85 is elevated, as shown in Figs. 6, 9 and 12. In practice it will be understood that the two solenoid-actuated valves are fixedly mounted on the carriage chassis to move therewith, as shown in Fig. 7a.

As previously indicated, the carriage of our machine is adapted to travel longitudinally of the stationary frame on rollers 38 which ride on the rails 34. However, the carriage always is urged toward the end position shown in Figs. 4 and 5 by means of a spring return mechanism best seen in Fig. 6. This comprises a shaft 96 supported in bearings 97 and carrying a spool or reel 98. A cable 99 wound on the reel is connected at its free end to the lower cross member 40c of the carriage. A torsion spring 100 encircling the shaft with one end connected to the reel and the other connected to one of the bearing brackets always applies a torque to the reel tending to turn it in such a direction as to wind up the cable; this of course draws the carriage toward the reel, its movement in that direction being limited however by rubber bumpers 101 against which the carriage abuts as shown in Fig. 4 when it reaches the end of the stationary frame.

One end of the drum 18 is slightly reduced in diameter as shown at 18a, and it will be noted that when the carriage is drawn by the aforementioned spring return mechanism to the end position illustrated in Figs. 4 and 5, the end section 18a of the drum is approximately centered on line 19. As previously stated, line 19 represents the path along which the glass fiber strand always proceeds downwardly from the stationary collecting shoe, not shown, in the course of the fiber drawing operation.

Considering the operation of our machine, let it be assumed that motors 26 and 44 are running and that the treadle-end of arm 54 is in its "down" position as shown by the solid lines in Fig. 6. Because of the latter fact, motor 44 is of course elevated, and consequently is ineffective to drive drum 18 because of the looseness of belt 45. Brake 77 is operated, insuring that drum 18 is stationary. Also, due to arm 54 being down, switch contact 70 (see Fig. 12) is open, so solenoids 91 and 93 are deenergized; accordingly, valves 90 and 92, pistons 83 and 87 and dog 85 are all positioned as shown in Fig. 12. Piston rod 83a is almost fully withdrawn into cylinder 82, and under the influence of the spring-biased reel 98 and cable 99, the carriage of our machine is held in the position shown in Figs. 4 and 5.

This, then represents the status of our machine when no fiber is being drawn. The only parts in operation are motor 44 (which at the moment is running without any load and serves no useful purpose) and motor 26 which, by turning cam 25, is causing bars 21 and 22 to reciprocate slowly in a horizontal direction. All other parts are stationary.

To begin the glass fiber drawing operation, the operator first releases brake 77 to free drum 18 for rotation. Then he draws the stranded glass filaments downwardly along the line 19 and wraps the end of the strand around the reduced section 18a of the drum while turning the latter manually until the strand is secured to the drum. When the strand is suitably secured, he merely presses on the "toe" end of treadle 55 which releases detent 65 and causes the machine to begin its automatic operation.

With the release of detent 65, lever 54 moves upwardly and motor 44 moves downwardly (see dotted lines, Fig. 6) tightening belt 45 and beginning to turn the drum 18 to wind the glass fiber strand thereon. In moving upwardly, lever 54 also closes contact 70 (Figs. 8 and 12) but this serves no useful purpose at the moment. The carriage of the machine remains stationary while the drum is accelerating so the glass strand is wound on section 18a thereof.

When the drum reaches full speed, the centrifugal switch closes contact 50 which, as will be seen from Fig. 12, completes an obvious circuit through the previously closed contact 70 for energizing solenoids 91 and 93 simultaneously. The resultant operation of valve 92 under control of solenoid 93 cuts the air supply line 95 off from cylinder 84 and permits the air in the cylinder to escape to atmosphere through port 96. Spring 89 therefore draws piston 87 upwardly and moves dog 85 downwardly so the latter rides on the reciprocating bar 21.

It should be noted at this point, referring to Fig. 5, that bar 21 does not travel far enough to the right in the course of its horizontal reciprocation to bring notch 21c into register with dog 85 when the carriage of my machine occupies the position shown in Fig. 5. Accordingly, when the dog descends, it cannot go immediately into the notch; and so long as the dog remains out of the notch even though it rides on the upper surface of the reciprocating bar, contact 88 remains closed.

The operation of valve 90 as a result of the aforementioned energization of solenoid 91 disconnects the air supply line 94 from the left-hand end of cylinder 82 and connects it to the right-hand end, causing the piston 83 to travel to the left in the cylinder. As will be clear from Fig. 4, the end of the piston rod 83a thereupon engages the left-hand leg 20 of the frame and the consequent rearward thrust on cylinder 82 pushes the carriage to the right. Dog 85 moves with the carriage, of course, this movement being in a leftward direction as seen in Fig. 5. Bearing in mind that notch 21c is traveling at a uniform speed between two fixed limits under control of the cam 25, it will be evident that the notch may be at any point between these two limits when dog 85 comes into registry therewith. An upstanding lug 21d is provided beside the notch for preventing the dog from overshooting the latter, and accordingly the dog drops into the notch when it comes into register therewith. The dog may strike lug 21d with considerable force (particularly if the lug happens to be traveling toward the dog at the moment of impact) but the force of the blow is absorbed by spring 32 which, it will be seen, permits rocker arm 28 and bar 21 to yield momentarily to the impact regardless of the position of cam 25.

As the dog drops into notch 21c, it opens contact 88 which interrupts the circuit of solenoid 91. Accordingly, valve 90 returns to the position shown in Fig. 12, causing piston 83 also to return to the position shown. The carriage now is free of the influence of piston 83 but it is latched by means of dog 85 and notch 21c to the reciprocating bar 21. It therefore travels back and forth at uniform speed along tracks 43, the distance of its travel in each direction being determined by the stroke of bar 21. The length of this stroke is such that only the limited portion B of the drum 18 moves back and forth across line 19; thus the strand traveling downwardly along line 19 onto the drum now is wound in uniform layers between the limits indicated by the dotted lines 18b.

From the description of the method given hereinbefore, it will be understood that the glass fiber wound on the reduced portion 18a of the drum during the time that it was accelerating is coarser than desired, while that now being wound on the drum between the limits 18b as the drum turns at full speed is fiber of the desired fineness.

Let it now be supposed that for some reason the speed of drum 18 drops below the speed at which it is required to turn in order to obtain glass filaments of the desired fineness. (This may, for example, be due to a drop in the line voltage to motor 44, slippage of belt 45 on its pulleys, or other electrical or mechanical difficulty.) When the drum drops below full speed, the centrifugal switch 50 opens, immediately interrupting the circuit of solenoid 93, which causes valve 92 to restore to the position shown in Fig. 12. The valve thereupon permits air to pass from line 94 into the upper end of cylinder 84 causing piston 87 to move downwardly and lift dog 85 out of the notch 21c so the carriage of the machine is disconnected from the reciprocating bar 21. Upon being so freed, the carriage, under the influence of the spring biased reel 98 and cable 99, immediately returns to the position shown in Figs. 4 and 5, so that winding of the strand continues on the reduced portion 18a of the drum. This strand of course is composed of filaments which due to the reduced speed of rotation of the drum are coarser than desired.

If the reduction in drum speed represents a transient condition which corrects itself without attention of the operator, centrifugal switch 50 will again close when the drum returns to full speed, and closing of this switch will initiate the same cycle of operations described hereinbefore; that is to say, it will cause the carriage to be shifted to the left (as seen in Fig. 5) by pneumatic cylinder 82 and latched to the reciprocating bar 21 by dog 85 so that winding of the strand in the region B of the drum is resumed.

Accordingly, the superfine glass fiber produced as a result of the drum running at full speed always is wound on the drum between the limits 18b, while the coarser filaments produced when the drum is running below full speed always are wound on the reduced portion 18a of the drum. It should also be understood that the speed at which the carriage of our machine moves as it is reciprocated under control of the bar 21 is relatively slower than the speed at which the carriage is moved away from its rest position by piston 83 or returned to its rest position by the spring return mechanism. These speeds preferably are such that adjacent turns of the strand wound on the drum in the region B are close together (i. e., a helix of low pitch) whereas the strand has a much higher pitch where it crosses shoulder 18c. This shoulder, of course, forms an arbitrary dividing line between the fine fiber and the coarser fiber, the purpose of which will be pointed out presently.

When the desired amount of superfine glass fiber has been collected on the drum, the operator steps on treadle 55, moving lever 54 downwardly. This opens contact 70 and thus interrupts the circuit of solenoid 93 whereupon dog 85 is lifted out of the notch 21c and the carriage is returned to the position shown in Figs. 4 and 5 all as explained above. The downward movement of lever 54 also serves to raise motor 44 loosening belt 45 so that driving power no longer is applied to the drum. As the drum decelerates, the glass strand is of course wound on section 18a thereof.

By drawing lever 81 toward himself, the operator now can apply the brake 77 in order to bring the drum to a rapid halt. As it slows to a stop, the operator can conveniently hold a knife or other cutting tool against shoulder 18c, the shoulder thus affording him a guide by means of which he can simply and surely sever the few connecting strands of glass that cross the line of this cut. The superfine fibers wound on section B of the drum then can be removed by making a single cut longitudinally of the drum through the superimposed layers, and the hank thus obtained is completely free of coarse fibers; the coarser fibers can of course be similarly cut from section 18a of the drum.

It should be noted that the brake 77 cannot be applied until the carriage of our machine has returned to the rest position shown in Figs. 4 and 5, a feature which insures that the operation of winding the glass strand on the drum always is transferred to section 18a of the drum before there can be any reduction in the drum speed by the brake. This safeguard is effected by means of a lug 79a on the crank member 79 which, as will be seen from Fig. 4, clears the end of rail 34 when the carriage is at rest, so that the brake lever 81 can be turned clockwise (Fig. 6). When the carriage is away from its rest position however, lug 79a projects over the forward rail 34, and the latter serves as a barrier against downward movement of lug 79a so that the brake cannot be applied by accident or carelessness while winding of the strand in region B of the drum is in progress.

Having provided a method and apparatus for producing superfine glass fibers of predetermined uniform diameter on a continuous basis, it will be seen that this invention is one well adapted to attain all of the ends and objects hereinbefore set forth, together with other advantages which are obvious and which are inherent to the invention.

In the embodiment of the apparatus described, the winding of the fine fiber in level layers on one section of the drum while the coarser fiber is wound on a second section axially separated from the first is effected wholly by automatic axial translation of the drum under control of the centrifugal switch. While we prefer this arrangement, it will be understood from the explanation given hereinbefore that in lieu of shifting the drum axially, the fiber-feeding apparatus (i. e., the bushing and shoe disposed above the drum) can be shifted axially of the drum by mechanism similar to the drum-traversing mechanism described above.

Inasmuch as many possible embodiments of the invention thus may be made without departing from the scope thereof, it is to be understood that all matter herein set forth or shown in the accompanying drawings is to be interpreted as illustrative and not in a limiting sense.

It also will be understood that certain features and subcombinations are of utility and may be employed without reference to other features and subcombinations.

Having thus described our invention, we claim:

1. In fiber-manufacturing apparatus of the type employing a rotary drum to draw the fiber from a fiber generating device and wind up the fiber as it is drawn, a stationary base, a carriage mounted on said base for reciprocatory movement, said drum being rotatably supported on said carriage with its axis substantially parallel to the direction of said movement, a prime mover connected to the drum to turn same, a driving member supported on said base for rectilinear movement in a direction paralleling the path of the carriage, power means connected to said driving member for reciprocating same between two fixed end portions, coacting latch elements on said member and carriage respectively for releasably connecting the two together to cause the carriage to travel with said member, and mechanism operative at times when said carriage is disconnected from said member for moving the carriage beyond the zone defined by the limits between which it travels when connected to said member.

2. Apparatus as in claim 1, wherein said prime mover is mounted on said carriage to travel therewith.

3. Apparatus as in claim 1, having means controlled by the speed of rotation of the drum for selectively actuating said last mechanism and said latch elements in accordance with said speed.

4. In fiber-manufacturing apparatus of the type employing a rotary drum to draw the fiber from a fiber-generating device and wind up the fiber as it is drawn, a stationary base, a carriage member and a driving member mounted on said base for independing rectilinear movement along parallel paths, mechanism for releasably latching the members together, said mechanism comprising coacting elements on the respective members, power means connected to said driving member for reciprocating same to cause the latch element on the driving member to travel between two fixed end positions, said carriage member having a normal rest position such that the latch element on the carriage member is spaced away, in the direction of said parallel paths, from the zone within which the latch element on said driving member moves as it travels between said end positions, means independent of said driving member for moving said carriage member to bring the latch element thereon within said zone, means operative to engage the two latch elements when the element on said carriage is within said zone, said drum being mounted on said carriage with its axis substantially parallel to the path of the carriage, and a prime mover connected to the drum for turning same.

5. In fiber-manufacturing apparatus of the type employing a rotary drum to draw the fiber from a fiber-generating device and wind up the fiber as it is drawn, a stationary base, a carriage member and a driving member mounted on said base for independent rectilinear movement along parallel paths, mechanism for releasably latching the members together, said mechanism comprising coacting elements on the respective members, power means connected to said driving member for reciprocating same to cause the latch element on said driving member to travel between two fixed end positions, said carriage member having a normal rest position such that the latch element on the carriage member is spaced away, in the direction of said parallel paths, from the zone within which the latch element on said driving member moves as it travels between said end positions, means independent of said driving member for moving said carriage member to bring the latch element thereon within said zone, means operative to engage said latch elements when the element on said carriage is within said zone, means operative to disengage said latch elements when the element on said carriage is within said zone, means independent of said driving member for restoring said carriage to its rest position when said latch elements are disengaged, said drum being mounted on said carriage with its axis substantially parallel to the path of the carriage, and a prime mover connected to the drum for turning same.

6. In fiber-manufacturing apparatus of the type employing a rotary drum to draw the fiber from a fiber-generating device and wind up the fiber as it is drawn, a stationary base, a carriage member and a driving member mounted on said base for independent rectilinear movement along parallel paths, latching mechanism effective when operated to connect said members for movement together, said mechanism comprising coacting elements on the respective members, power means connected to said driving member for reciprocating same to cause the latch element on said driving member to travel between two fixed end positions, said carriage member normally occupying a rest position wherein the latch element on the carriage member is spaced away, in the direction of said paths, from the zone within which the latch element on said driving member moves as it travels between said end positions, said drum being mounted on said carriage with its axis substantially parallel to the path of the carriage, a prime mover normally disconnected from said drum but connectable thereto to turn the drum, means controlled by the speed of rotation of the drum and effective when the drum reaches a predetermined speed to move said carriage away from its rest position to bring the latch element on the carriage within said zone, and auxiliary means also controlled by the speed of the drum to operate said latching mechanism to connect the two members together responsive to the latch element on the carriage being brought within said zone.

7. In fiber-manufacturing apparatus of the type employing a rotary drum to draw the fiber from a fiber-generating unit and wind up the fiber as it is drawn, a stationary base, a carriage member and a driving member mounted on said base for independent rectilinear movement along parallel paths, latching mechanism effective when operated to connect said members for movement together, said mechanism comprising coacting elements on the respective members, power means connected to said driving member for reciprocating same to cause the latch element on said driving member to travel between two fixed end positions, said carriage member normally occupying a rest position wherein the latch element on the carriage member is spaced away, in the direction of said paths, from the zone within which the latch element on said driving member moves as it travels between said end positions, said drum being mounted on said carriage with its axis substantially parallel to the path of the carriage, a prime mover normally disconnected from said drum but connectable thereto to turn the drum, means controlled by the speed of rotation of the drum and effective when the drum reaches a predetermined speed to move said carriage away from its rest position to bring the latch element on the carriage within said zone, auxiliary means also controlled by the speed of the drum to operate said latching mechanism to connect the two members together responsive to the latch element on the carriage being brought within said zone, a device operable to disconnect the prime mover from said drum, and said last two means controlled by said device responsive to the operation thereof to disconnect the members from one another and restore said carriage member to said rest position.

8. Apparatus as in claim 4 wherein said carriage member moving means comprises a cylinder and a fluid-actuated piston in the cylinder.

9. Apparatus as in claim 4 including yieldable means always urging said carriage toward said rest position whereby it normally occupies said position whenever it is unlatched from said driving member.

10. Apparatus as in claim 4 including means under the control of said latching mechanism for disabling said carriage moving means responsive to the carriage being connected to the driving member.

11. Apparatus as in claim 4 including means controlled by the speed of rotation of the drum for releasing said latching mechanism responsive to the drum speed dropping below a fixed value.

12. Apparatus as in claim 4 including a brake operable to reduce the speed of rotation of the drum, and means for disabling the said brake whenever said carriage is within the zone that lies between said end positions.

References Cited in the file of this patent

UNITED STATES PATENTS

| 1,738,217 | Wellech | Dec. 3, 1929 |
| 1,968,693 | Kroger et al. | July 31, 1934 |
| 2,110,926 | Williams | Mar. 15, 1938 |
| 2,410,673 | Naumann | Nov. 5, 1946 |
| 2,527,502 | Simison et al. | Oct. 24, 1950 |
| 2,631,787 | Tata | Mar. 17, 1953 |
| 2,638,279 | Winslow | May 12, 1953 |